United States Patent [19]

Boissevain

[11] Patent Number: 4,964,311
[45] Date of Patent: Oct. 23, 1990

[54] DIGITALLY INCREMENTED LINEAR ACTUATOR

[75] Inventor: Mathew G. Boissevain, Los Altos, Calif.

[73] Assignee: Measurex Corporation, Cupertino, Calif.

[21] Appl. No.: 303,450

[22] Filed: Jan. 27, 1989

[51] Int. Cl.⁵ ............................................. G05G 11/00
[52] U.S. Cl. .......................................... 74/110; 74/526
[58] Field of Search .................................. 74/110, 526

[56] References Cited

U.S. PATENT DOCUMENTS

| | | | |
|---|---|---|---|
| 2,666,516 | 1/1989 | Boni | 400/100 |
| 3,064,470 | 11/1962 | Stevko | 73/117.3 |
| 3,686,970 | 8/1972 | Bozoyan | 74/479 |
| 3,762,237 | 10/1973 | Stevko | 74/479 |

Primary Examiner—Peter R. Brown
Attorney, Agent, or Firm—Spensley, Horn, Jubas & Lubitz

[57] ABSTRACT

A linear actuator having an actuator member driven in a linear direction by a lever mechanism pivotally coupled thereto which is in turn driven by a plurality of on/off linear drivers. Driving the linear drivers through varying stroke distances provides a sequence of discrete actuator steps. By providing an interconnected simple lever mechanism a discrete set of $2^n$ steps may be provided for n drive positions and n on/off linear drivers. The linear actuator thus provides simple integration with a digital control system and precise positive discrete steps of linear actuation.

21 Claims, 3 Drawing Sheets

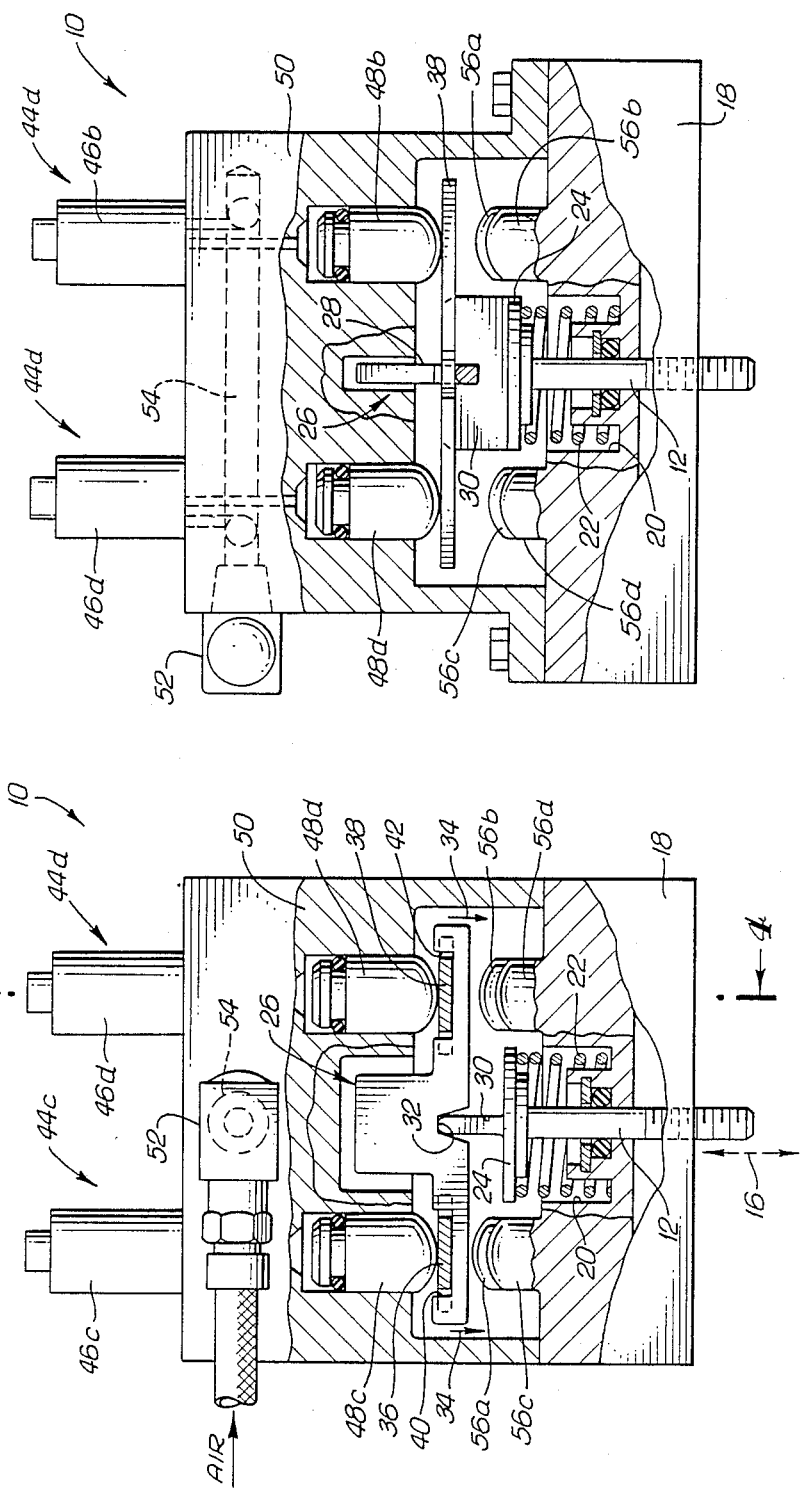

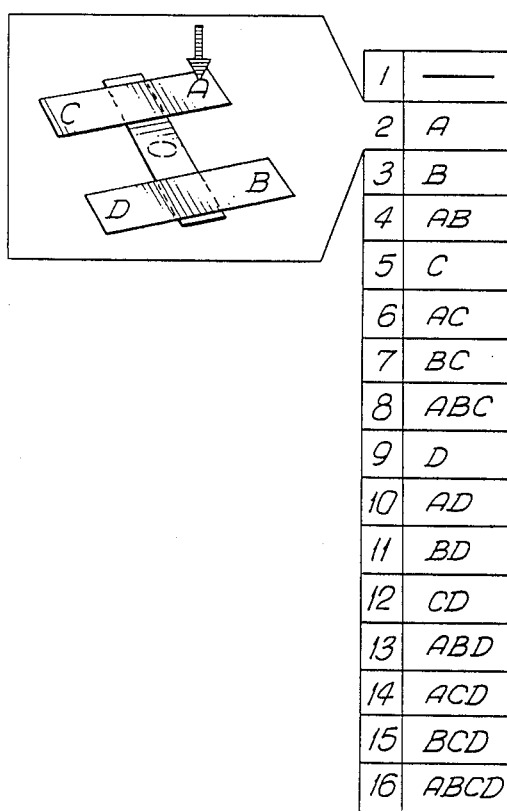
Fig. 5
Fig. 6
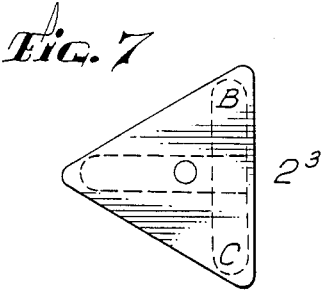
Fig. 7
Fig. 8
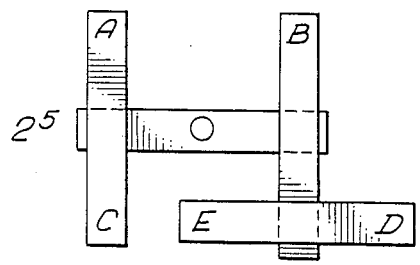

DIGITALLY INCREMENTED LINEAR ACTUATOR

BACKGROUND OF THE INVENTION

The present invention relates to actuator mechanisms. More particularly, the present invention relates to systems for providing accurate mechanical control of a movable member in a linear direction.

In a wide variety of applications, it is important to provide precise linear motion of an actuator member in response to a control signal. For example, in many industrial and robotics applications such precise control of linear motion is very important.

For example, one industrial application where such linear control is important is in valve systems for controlling the flow of steam or other fluids which need to be controllably released. In such applications, a piston or some other type of value stem is moved linearly under the control of a linear actuator to open a valve opening by an amount corresponding to the amount of linear motion. Linear actuators commonly employed for such applications include pneumatic and hydraulic driven pistons, worm gears and cam driven rods. Such prior art linear actuators used in control valves have several disadvantages, however. In particular, in applications requiring control of high temperature fluids such as steam, or low temperature fluids such as refrigerants, the temperature variations in the valve system can result in variations in the response of the linear actuator. For example, stiction in the actuator may occur such that when a control signal is applied, the actuator may move in a discontinuous manner or not at all. Such variations are uncontrollable and unpredictable thereby creating inaccuracies in the operation of the valve. The resulting variations in the amount of fluid controlled by the valve may have serious consequences for industrial process control. Additionally, such problems will be important in applications where a relatively short linear stroke for the actuator must be controlled accurately and/or under substantial load, or when substantial variations in operating conditions arise.

Another problem experienced in many applications of the aforementioned linear actuators relates to the inherently analog nature of such actuators. In order to provide more than two linear positions, such actuators require an analog control signal provided from a control system to drive the linear actuator by the desired amount. The control electronics employed in industrial and robotics is becoming predominantly digital in nature, however, frequently being under microprocessor or larger computer control. This requires interface electronics to allow the digital control system to control the inherently analog linear actuator. Alternatively, an on/-off approach has been employed, for example, using on/off electrical solenoids, to provide a simple two-way linear actuation system suitable for digital control. However, such a two-way system cannot provide the more detailed adjustments necessary for many applications. Therefore, for example, to obtain a range of fluid flow through a two-way valve a plurality of valves must be employed, each driven on or off by an on/off linear valve actuator, to give a desired range of control. Additionally, many applications other than valve control require more than the simple on/off linear actuation provided by such solenoid type actuators.

Additionally, prior art linear actuators providing continuous linear motion, such as worm gear, pneumatic or hydraulic actuators, generally lack any positive mechanical calibration of the actuation distance. Rather, such actuators depend on the control electronics to ensure the correct amount of linear actuation. Alternatively, complicated and expensive sensors and feedback control systems are needed to ensure the mechanical actuator has correctly responded to the analog control signal to provide the desired amount of linear travel. For many applications requiring very compact systems or operating in extreme or demanding environments, such sensors and feedback control systems can involve extremely difficult design problems and considerable expense. For example, this is especially true in the harsh, corrosive environment of paper making which requires extremely high reliability coupled with continuous production schedules.

Accordingly, a need presently exists for a linear actuator providing precise and positive linear motion compatible with digital control systems and not requiring complex feedback control.

SUMMARY OF THE INVENTION

The present invention provides a linear actuator which provides a plurality of well-defined discrete actuation steps in response to a digital control signal.

The present invention further provides a linear actuator which provides a plurality of actuation steps which are mechanically determined in length and are not subject to undesired variations in the length of actuation stroke.

The present invention further provides a linear actuator of a relatively simple construction which does not require a feedback system or complex control system to ensure precise actuation steps.

In a preferred embodiment, the present invention employs a lever mechanism which is pivotally mounted to the actuator member to be linearly driven. The actuator member may be a simple piston, rod or other member which is desired to be driven accurately in a given linear direction or may be integrally coupled with a more complicated structure depending upon the specific application. The lever mechanism is linearly movable with the actuator member and drives the actuator member by a pivoting action described in more detail below. The actuator member and lever mechanism are held in a normally retracted position by a biasing mechanism; for example, a simple spring may be employed. The lever mechanism is driven from the retracted position in the direction of linear travel of the actuator member by a plurality of on/off linear drivers, for example solenoid actuated pneumatic pistons. The linear drivers drive the lever mechanism at drive positions displaced from the point of contact of the lever mechanism and the actuator member. This causes the lever mechanism to pivot and drive the actuator member by a fraction of the driver stroke, the ratio of the stroke distance to distance travelled by the actuator member being determined by the geometry of the lever mechanism and the point of coupling to the actuator member. A plurality of mechanical stops, equal in number to the number of drivers, are provided to stop the stroke of each driver at a predetermined distance. These stops may be integrally mounted in the base of the linear actuator with the actuator member free to travel through an opening in the center of the base.

The number of discrete positions of linear travel provided by the linear actuator of the present invention is determined by the number of on/off drivers and the geometry of the lever mechanism. In a preferred embodiment, the lever mechanism and drivers are configured such that an integer number n of drivers can provide $2^n$ discrete positions of linear travel for the actuator member. The variation in stroke length between the drivers in turn determines the length of the individual discrete steps of the actuator member. For example, in a preferred embodiment where each of the linear actuator steps is equal, the stroke length as determined by the stops will follow a ratio of 1-2-4-8, etc., assuming a symmetrical lever mechanism and symmetrically placed drivers. This provides 16 increments of stroke.

In a preferred embodiment, the lever mechanism employed includes a series of elongated bar-shaped levers pivotally coupled to each other and to the actuator member. The number of simple bar-shaped levers within the lever mechanism depends upon the number of discrete steps of linear travel desired. For example, for the simplest system the lever mechanism employs a single lever driven at opposite ends thereof by two on/off linear drivers. With two different stroke lengths provided for the drivers, $2^2$ (or four) different linear actuator positions are possible. To obtain $2^3$ (or 8) discrete positions of travel for the actuator member, a lever mechanism employing a triangular plate may be used. By positioning the on/off linear drivers at the three corners of the ends of the triangular plate, the three drivers having three distinct stroke lengths, $2^3$ actuation positions may be provided in accordance with the eight ways in which the three linear drivers may be actuated. Alternatively, a "T"-shaped structure employing a first bar pivotally coupled to the actuator member and a second bar pivotally coupled to the first bar at one end thereof may be employed. Similarly, to generate an additional doubling of linear positions, a third lever bar may be pivotally coupled to the other end of the first bar to provide an "H"-shaped structure. With four linear drivers having four distinct stroke distances, $2^4$ (or 16) distinct linear positions for the actuator member may be provided. It will be readily appreciated that $2^n$ discrete linear positions thus may be provided by employing n on/off drivers and the appropriate configuration of levers.

The linear actuator of the present invention is readily compatible with a digital control system. Specifically, since $2^n$ linear positions are provided, where is n the number of linear drivers, and each linear driver is controlled by a simple on/off signal, an n bit digital control signal has the necessary control information to operate the linear actuator of the present invention. Accordingly, the linear actuator of the present invention may be readily integrated with a digital control system and no digital-to-analog conversion electronics or other interface electronics are required. Furthermore, the discrete positions of the linear actuator are controlled exclusively by the digital signal and the stroke length of the individual linear drivers. Since the stroke length is preferably controlled by mechanical stops which may be accurately machined, a precisely reproduceable series of linear acuation steps are provided. Therefore, no feedback sensors or control system are required to ensure the position of the actuator member since the mechanical stops ensure such positioning automatically. Additionally, since each linear driver undergoes a single positive stroke upon actuation, the linear actuator of the invention is not subject to stiction or other similar variations in positioning due to temperature or other variations in operating conditions common in industrial applications.

Accordingly, the present invention provides a linear actuator providing positive and accurate control of a plurality of actuation steps which are controllable by simple digital control systems.

Numerous other advantages of the linear actuator of the present invention will be appreciated from the following detailed disclosure of the present invention.

BRIEF DESCRIPTION OF THE DRAWINGS

FIG. 3 is a cross sectional view of the linear actuator of FIG. 1.

FIG. 4 is a cross sectional view taken through another cross sectional direction of the linear actuator of FIG. 1.

FIG. 5 is a drawing illustrating the combination of linear actuation sequences for providing the 16 distinct linear positions of the linear actuator of FIG. 1.

FIG. 6 is a top view of a lever mechanism for a linear actuator providing four linear positions.

FIG. 7 is a top view of a lever mechanism for a linear actuator providing eight linear positions.

FIG. 8 is a top view of a lever mechanism for a linear actuator providing 32 linear positions.

DETAILED DESCRIPTION

Figure 1:
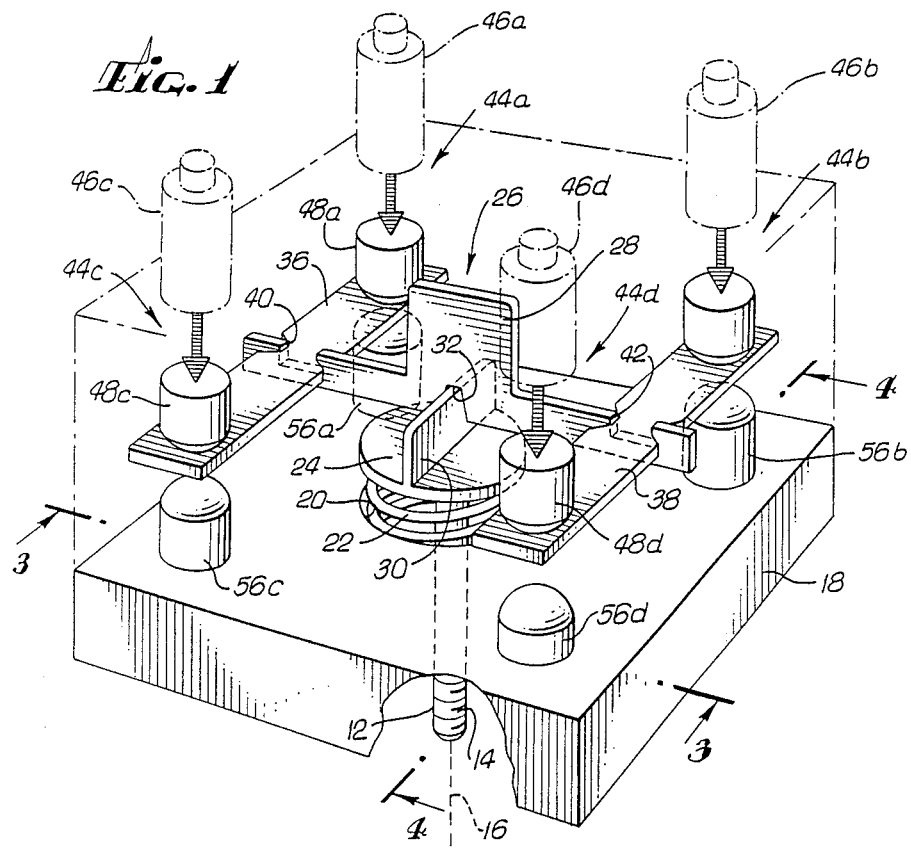
FIG. 1 is a perspective cutaway view of an embodiment of the linear actuator of the present invention having 16 linear positions.

Referring to FIG. 1, a preferred embodiment of the linear actuator of the present invention is illustrated in a perspective cutaway view. The linear actuator illustrated in FIG. 1 is an embodiment providing $2^4$ (16) discrete linear positions. As will be discussed in more detail below, other embodiments are also possible for providing additional or fewer discrete linear actuation steps. In general, the linear actuator of the present invention may provide $2^n$ different discrete acuation steps, where n is an integer.

Referring to FIG. 1, the 16 position linear actuator 10 employs an actuator member 12 which is linearly driven. The actuator member 12 is illustrated as a simple piston or rod in FIG. 1, however, may be varied in shape and length for the particular application. Alternatively, as shown in FIG. 1, the rod shaped actuator member 12 may have threads 14 on the bottom thereof, which may receive an attachment, such as a valve stem, etc., for the specific application. Actuator member 12 is free to move in, and is driven in, a linear direction indicated by arrow 16. In the embodiment of FIG. 1, this corresponds to the axis of the rod shaped actuator member 12. As shown in more detail in the cross-sectional drawings of FIGS. 3 and 4, the actuator member 12 resides in a housing base 18. Base 18 may be simply a rectangle block of solid material such as steel or aluminum with a cylindrical opening therein allowing travel of the actuator member 12 in the linear direction 16. Additionally, the housing base 18 has a wider cylindrical recessed region 20 to receive a biasing mechanism 22. The biasing mechanism 22 may take the form of a simple helical spring, which rests within the cylindrical cavity 20. As discussed below, biasing mechanism 22 biases actuator member 12 upward by engaging an upper disk-shaped portion 24 of the actuator member 12.

Linear motion is imparted to the actuator member 12 by a movable lever mechanism 26, shown in a perspective view in FIG. 1. In the embodiment of FIG. 1 where $2^4$ (16) discrete linear positions are desired, the lever mechanism 26 has a generally "H"-shaped structure when viewed from above. This structure includes a first lever bar 28 pivotally coupled to the top portion of the actuator member 12. As shown in FIG. 1 and in cross-section in FIG. 3, the pivotal coupling between the first lever bar 28 and actuator member 12 may be provided through a vertically extending plate 30 integrally mounted on the disk shaped upper poriton 24 of actuator member 12 along with a matching wedge-shaped opening 32 in first lever bar 28. With the first lever bar 28 resting freely on plate 30 the lever bar 28 is thus free to pivot through a small angular range as indicated by arrows 34 in FIG. 3.

Referring to FIG. 1, the lever mechanism 26 further includes second and third lever bars 36, 38, respectively, pivotally coupled to the first lever bar 28 at opposite ends thereof. The first lever bar 28, second lever bar 36 and third lever bar 38, thus form a generally "H"-shaped structure when viewed from above. Second lever bar 36 and third lever bar 38 are pivotally mounted on first lever bar 28 by resting them in matching notched recesses, 40, 42 in first lever bar 28, illustrated by dashed lines in FIG. 1 and in cross section in FIG. 3. While this provides a simple mounting arrangement for purposes of manufacturing and assembly, it will be appreciated that many other mounting techniques are possible while obtaining the desired pivotal motion about the first lever bar 28.

As illustrated schematically in FIG. 1, the lever mechanism 26 is driven downward, i.e. in the direction of linear travel 16, by four linear on/off drivers 44a, 44b, 44c, and 44d. As may be seen from FIG. 1, the four linear drivers 44a, 44b, 44c and 44d drive the lever mechanism 26 through four separated driving positions at the ends of the "H"-shaped lever mechanism 26; that is, at the respective ends of the second and third lever bars 36, 38. As will be appreciated from inspection of FIG. 1, and as described in more detail below, the positioning of the drivers at the ends of the "H"-shaped structure of the lever mechanism 26 causes the lever mechanism 26 to undergo various pivoting actions in addition to vertical translation upon actuation of varying ones of the drivers 44a-44d.

Linear drivers 44a-44d may be any one of a number of well known linear actuators of the type including solenoids, hydraulic and pneumatic driven piston actuators and the like. For example, for many industrial applications, solenoid actuated pneumatic valves 46a-46d and corresponding air driven pistons 48a-48d may be employed. Suitable pneumatic valves are commercially available, for example the HS and LS models of three way solenoid actuated pneumatic valves manufactured by Numatics, Inc. of Highland, Mich. may suitably be employed. As illustrated in the cross-sectional views of FIG. 3 and FIG. 4, the pneumatic linear drivers 44a-44d may be readily integrated in an upper housing block 50 of the linear actuator by providing a high pressure air supply 52 through a set of channels 54 in the housing block 50 to the mounting positions of the solenoid actuated pneumatic valves 46a-46b and corresponding air driven pistons 48a-48d. The solenoid actuated valves 46a-46b in turn may be activated by a simple on-off control signal provided along a control wire (not shown) from a suitable control system (not shown).

The stroke of the individual linear drivers 44a-44d is preferably controlled by a matching number of mechanical stops 56a-56d, illustrated in FIG. 1. Mechanical stops 56a-56d are preferably integrally mounted on housing base 18 and may be of the same material as base 18. Due to their simple structure, the mechanical stops 56a-56d may be machined by numerical control manufacturing methods to provide a precise height above housing base 18 and hence a precise stroke distance for the respective linear drivers 44a-44d. As will be described in more detail below, in order to provide the 16 discrete linear positions for the actuator member 12, the mechanical stops 56a-56d should be of a height to provide a varying stroke length for each driver 44a-44d.

It will be appreciated from inspection of FIG. 1 and simple combinatorics, that selected activation of the linear drivers 44a-44d can result in $2^4$ (16) distinct combinations of on/off activation positions of the four linear drivers. This in turn will result in 16 distinct positions for the lever mechanism 26 and hence 16 distinct linear positions for the actuator member 12 coupled thereto. By appropriate selection of the stroke lengths of the drivers 44a-44d by means of adjustment of the height of the stops 56a-56b, the 16 positions may be adjusted to provide equal linear actuation steps for actuator member 12. As will be discussed below, to provide equal length linear actuations steps a stroke length ratio of 1-2-4-8, respectively, should be employed.

Figures 2A, 2B:
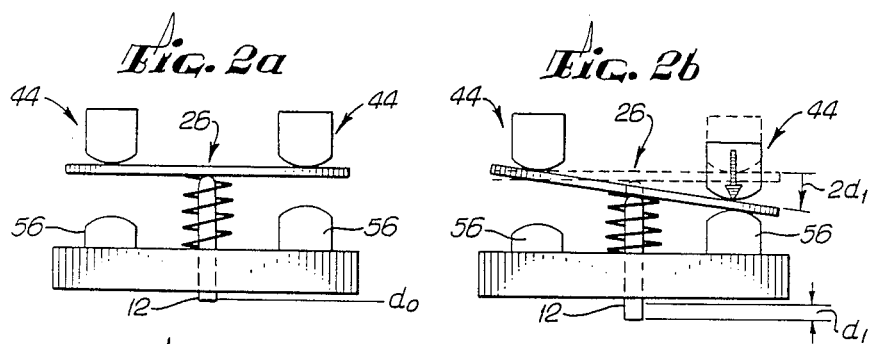
FIGS. 2a, 2b, 2c and 2d are cross-sectional views of a portion of the linear actuator of FIG. 1 schematically illustrating the operation thereof.
Figures 2C, 2D:
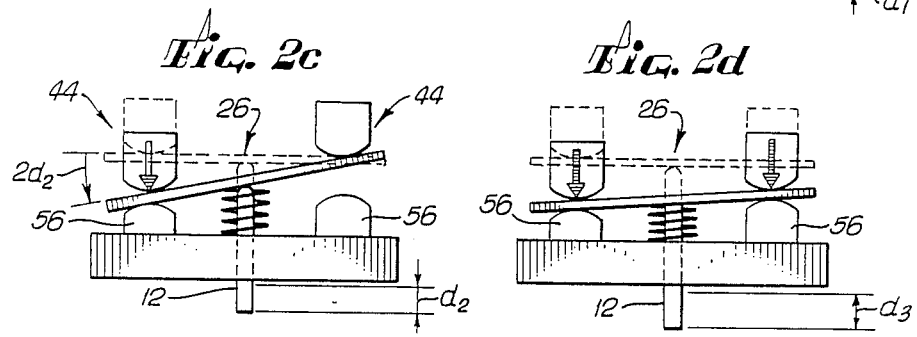

Referring to FIGS. 2a, 2b, 2c, and 2d, the relationship between the linear driver stroke length and the positions of the actuator member 12 are illustrated for a simple single lever mechanism. (The single lever mechanism may also be considered a cross-sectional drawing of the mechanism of FIG. 1 showing third lever bar 38 with the other lever bars suppressed.) By selective activation of the two linear drivers, the actuator member 12 is driven through $2^2$ (4) distinct linear positions $d_0$, $d_1$, $d_2$ and $d_3$, as shown in FIGS. 2a, 2b, 2c and 2d, respectively. As shown in FIG. 2a, the first position of the actuator member 12 is the retracted position $d_0$ corresponding to the lever mechanism 26 biased against the linear drivers 44. As shown in FIG. 2b, activation of one of the two drivers 44 through a stroke distance to $d_1$ determined by corresponding mechanical stop 56, drives the point of contact of the lever mechanism 26 and hence actuator member 12 coupled thereto, through a linear distance one-half as great, $d_1$. Similarly, as shown in FIG. 2c, actuation of the other linear driver to a second stroke distance $2d_2$ drives the actuator member to a distance $d_2$. Finally, as shown in FIG. 2d, actuation of both linear drivers 44 results in movement of actuator member 12 to a fourth linear position $d_3$. Simple geometry indicates that the distance $d_3$ the halfway point between the first stroke distance $2d_1$ and the second stroke distance $2d_2$. Or, algebraically:

$$d_3 = 2d_1 + \tfrac{1}{2}(2d_2 - 2d_1)$$

Therefore, if it is desired that the step distance of the actuator member 12 between the four positions $d_0$, $d_1$, $d_2$ and $d_3$ be made equal, it is simply necessary to choose $d_2$ equal to $2d_1$ resulting in equal step distances of $d_1$ between each of the four positions.

It will be appreciated that by providing an additional pivotal degree of freedom by an additional lever bar, the number of discrete positions of FIGS. 2a-2d is doubled. Therefore, for a combination with two such additional lever bars as shown in FIG. 1, the positions of FIG. 2a-2d are quadrupled, or, in other words, sixteen distinct positions, ($2^4$), are provided corresponding to the four driving positions with four distinct stroke distances. Similarly, for n driving positions and n distinct stroke distances, $2^n$ distinct linear positions can be provided.

Referring to FIG. 5, the sixteen distinct positions for the actuator of FIG. 1 are illustrated schematically by combinations of the four driver positions A, B, C, D in the "H"-shaped lever mechanism (corresponding to the linear drivers 44a-44d). In correspondence with FIG. 1, position A in FIG. 5 corresponds to the minimum stroke distance (as determined by first mechanical stop 56a), B the next greatest stroke distance (as determined by mechanical stop 56b), C the next greatest stroke distance (as determined by mechanical stop 56c), and D the greatest stroke distance (as determined by mechanical stop 56d). The sixteen combinations of the linear strokes through each of these four drive positions A, B, C, D thus provides the sixteen discrete linear positions of actuator member 12 of the embodiment of FIG. 1.

To provide a constant step size for the sixteen linear positions a relative stroke length for driver positions A, B, C, D of 1-2-4-8 should be employed, for the reasons discussed in relation to FIGS. 2a-2d. Since the selection of this ratio of stroke length is based on a theoretical geometrical analysis of the lever mechanism and stroke lengths, however, for actual mechanical implementations with finite thickness levers and other departures from theoretical line geometry, some departure from the above-described stroke ratio may be necessary to achieve approximately equal step length for the actuator member. For example, in an implementation of the sixteen position linear actuator illustrated in FIG. 1, designed to achieve a 10 mil step length, the following stroke lengths were found to give the best results: A=0.035 inches; B=0.070 inches; C=0.140 inches; and D=0.270 inches. This was found to provide an approximately 10 mil step size with a 4 mil tolerance.

Referring to FIGS. 6, 7 and 8, lever mechanism designs are illustrated schematically which correspond to linear actuators with $2^2$, $2^3$ and $2^5$ discrete linear positions, respectively. The 2 position system of FIG. 6 has been described above in relation to FIGS. 2a-2d. The embodiment of FIG. 7 provides $2^3$ (8) discrete linear positions by employing a three drive position (A, B, C) configuration which may be provided through a triangular shaped plate lever mechanism or the functionally equivalent "T"-shaped two lever system. FIG. 8 illustrates the extension to $2^5$ (32) discrete linear positions which extends the $2^4$ (16) structure of FIG. 1 in a natural way.

It will be appreciated that additional increases in the number of linear positions may be achieved by adding to the structure of FIG. 8 additional drive positions by adding additional lever bars. Therefore, in general, $2^n$ discrete linear positions may be provided by employing an integer number n of drive positions for the level mechanism, and n on/off linear drivers each driver having a differing stroke length.

It will be appreciated that the linear actuator of the present invention is readily compatible with a digital control system. Specifically, the specific actuation positions are determined by simple on-off signals applied to the solenoid actuators employed as linear drivers. Therefore, to drive, for example, the linear actuator illustrated in FIG. 1 a series of four control signals, each capable of driving the respective solenoid into an on or off condition may be employed. Thus, the control signal needed to control the linear actuator of FIG. 1 is equivalent to a 4-bit digital signal. Therefore, the linear actuator of the present invention is well suited to integrate directly with a digital control system and does not require digital-to-analog conversion circuitry or other interface circuitry with such a digital control system.

Additionally, it will be appreciated that the discrete steps of the linear actuator of the present invention are controlled solely by the on-off condition of the solenoid drivers and the respective stroke length as determined by the mechanical stops. Accordingly, a feedback type control system is not necessary to ensure the accurate positioning of the actuator since neither the mechanical stops nor the action of the individual drivers will be subject to variations due to the ambient operating conditions of the actuator, wear, fatigue or similar variations. Furthermore, due to the relatively simple mechanical structure of the linear actuator of the present invention, a high degree of reliability and long operating lifetime are provided.

It will be appreciated by those of ordinary skill in the art that a wide variety of modifications to the foregoing preferred embodiment are possible while remaining within the scope of the present invention. For example, many variations in the specific type of drivers selected, lever mechanism configurations, biasing mechanism, and actuator member are possible while remaining within the scope of the present invention. Many additional variations will be apparent to those of ordinary skill in the art and accordingly the scope of the present invention is best defined by the following claims.

What is claimed is:

1. A linear actuator for providing a plurality of discrete linear actuator steps, comprising:
    a base;
    an actuator member movable relative to said base in a linear direction;
    lever means, pivotably mounted to said actuator member at a pivot position centrally located on said lever means and linearly movable with said actuator member, for driving the actuator member through said pivot position;
    linear drive means, provided adjacent said lever means, for selectively driving said lever means at a plurality of drive positions through a stroke distance differing at each stroke position, said drive positions being displaced from said pivot position so as to cause pivoting of said lever means and linear motion of said actuator member from said first position by an amount determined by said selected one or more of said drive positions; and
    biasing means for providing a biasing force between said base and said lever means and actuator member so as to hold said lever means against said linear drive means.

2. A linear actuator as set out in claim 1, further comprising a plurality of stop means, equal in number to said plurality of drive positions and integrally mounted on the base, for stopping the lever means at a different linear position for each drive position.

3. A linear actuator as set out in claim 2, wherein said stop means stop the stroke of said linear drive means at said respective drive positions to provide a ratio of stroke lengths of 1-2-4 where said plurality of drive positions are three in number.

4. A linear actuator as set out in claim 2, wherein said stop means comprises a plurality of mechanical stops equal in number to said plurality of drive positions.

5. A linear actuator as set out in claim 1, wherein said lever means comprises an elongated bar and wherein said plurality of drive positions comprises two drive positions located at each end of the elongated bar.

6. A linear actuator as set out in claim 1, wherein said lever means comprises a first elongated bar pivotally coupled to said actuator member and a second elongated bar pivotably coupled to said first elongated bar at one end thereof and wherein said plurality of drive positions comprise three drive positions positioned at the three corners formed by one end of the first elongated bar and two ends of the second elongated bars.

7. A linear actuator as set out in claim 6, wherein said first elongated bar and said second elongated bar each have an upper surface and are coupled such that their upper surfaces lie on a plane when they are not pivoted by said drive means.

8. A linear actuator as set out in claim 1, wherein said lever means comprises a triangular-shaped plate pivotably mounted to said actuator member at a center portion thereof and wherein said plurality of drive positions comprise three drive positions located at the three corners of said triangular shaped plate.

9. A linear actuator as set out in claim 1, wherein said lever means comprises a first bar pivotably coupled to said actuator member, a second bar pivotably coupled to said first bar at one end thereof, and a third bar pivotably coupled to said first bar at the other end thereof, and wherein said plurality of drive positions comprises four positions located at the ends of said second and third bars.

10. A linear actuator as set out in claim 9, wherein said second elongated bar and said third elongated bar each have an upper surface and wherein said second and third elongated bars are coupled to said first elongated bar such that their upper surfaces lie on a plane when they are not pivoted by said drive means.

11. A linear actuator as set out in claim 10, wherein said biasing means biases said second and third elongated bars against said driving means.

12. A linear actuator as set out in claim 1, wherein said plurality of drive positions comprises n drive positions where n is an integer and said actuator member is positionable at $2^n$ distinct linear positions by said lever means.

13. A linear actuator as set out in claim 1, wherein said lever means is pivotable in six distinct angular directions.

14. A linear actuator as set out in claim 1, wherein said linear drive means provides a linear drive stroke distance at said respective drive positions with a ratio of stroke length of 1-2-4-8 and wherein said plurality of drive positions are four in number.

15. A linear actuator, comprising:
a base;
an actuator member movable in a linear direction, said actuator member having a first lever coupling position;
a first lever pivotably coupled to said actuator member at said first lever coupling position, said first lever extending in a first direction in a plane generally perpendicular to said linear direction and having second and third lever coupling positions on opposite sides of said first lever coupling position;
a second lever pivotably coupled to said first lever at said second lever coupling position, said second lever extending in a second direction in a plane generally perpendicular to said linear direction;
a third lever pivotably coupled to said first lever at said third lever coupling position, said second lever extending in a third direction in a plane generally perpendicular to said linear direction;
first, second, third and fourth linear drive means positioned adjacent said second and third levers, for driving said second and third levers at first, second, third and fourth linear driving positions displaced from said first, second, and third lever coupling positions;
first, second, third and fourth stopping means for stopping the travel of said second and third levers at first, second, third and fourth stroke distances, respectively; and
biasing means for biasing said actuator member and said first, second and third levers coupled thereto against said linear drive means; and
a housing casing, mounted to said base to form a housing, wherein said base includes a cylindrical shaft for receiving said actuator member and allowing travel in said linear direction therethrough, and wherein said first, second, third and fourth stopping means comprise mechanical stops integrally formed in said base, said first, second, third and fourth mechanical stops having different heights to thereby provide said different stroke distances;
wherein said first, second, third and fourth drive means are selectively actuated to drive said second and third levers and said first lever and said actuator member coupled thereto, through a plurality of discrete actuation distances dependent on the combination of drive means actuated.

16. A linear actuator as set out in claim 15, wherein said biasing means is a spring.

17. A linear actuator as set out in claim 15, wherein each of said first, second, third and fourth linear drive means comprises a solenoid actuator.

18. A linear actuator as set out in claim 15, wherein said stroke lengths provided by said first, second, third and fourth stopping means are in a ratio of 1-2-4-8.

19. A method for providing a plurality of discrete linear actuation steps in a linear actuator having a base, an actuator member movable in a linear direction, a plurality of mechanical stops mounted on said base and extending different heights from said base, and a lever mechanism coupled to said actuator member and movable therewith for driving said actuator member, comprising the steps:
pivotally driving said lever mechanism at a first position such that a portion of said lever mechanism travels a first distance, said first distance determined by a first mechanical stop, and said actuator member coupled thereto travels a portion of said first distance to provide a first linear actuator step;
pivotally driving said lever mechanism at a second position such that a portion of said lever mechanism travels a second distance, said second distance determined by a second mechanical stop, and said actuator member coupled thereto travels a portion of said second distance to provide a second linear actuation step; and
pivotally driving said lever mechanism at said first and second positions, such that respective portions of said lever mechanism travel said first and second distances respectively, thereby causing said linear actuator member coupled thereto to travel through a third linear actuation step.

20. A method as set out in claim 19, further comprising the steps:
    pivotally driving said lever mechanism at a third position such that a portion of said lever mechanism travels a third distance, said third distance determined by a third mechanical stop, and said actuator member coupled thereto travels a portion of said third distance to provide a fourth linear actuation step;
    pivotally driving said lever mechanism at said first and third positions, such that respectively portions of said lever mechanism travel said first and third distances respectively, thereby causing said linear actuator member coupled thereto to travel through a fifth linear actuation step;
    pivotally driving said lever mechanism at said second and third positions, such that respective portions of said lever mechanism travel said second and third distances respectively, thereby causing said linear actuator member coupled thereto to travel through a sixth linear actuation step; and
    pivotally driving said lever mechanism at said first, second and third driving positions such that respective portions of said lever mechanism travel through said first, second and third distances respectively, such that said movable actuator member coupled thereto travels through a seventh linear actuation step.

21. A method as st out in claim 20, further comprising the steps:
    pivotally driving said lever mechanism at a fourth position such that a portion of said lever mechanism travels fourth distance, the fourth distance determined by a fourth mechanical stop, and said actuator member coupled thereto travels a portion of said fourth distance to provide an eighth linear actuation step;
    pivotally driving said lever mechanism at said first and fourth positions, such that respective portions of said lever mechanism travel said first and fourth distances respectively, thereby causing said linear actuator member coupled thereto to travel through a ninth linear actuation step;
    pivotally driving said lever mechanism at said second and fourth positions, such that respective portions of said lever mechanism travel said second and fourth distances respectively, thereby causing said linear actuator member coupled thereto to travel through a tenth linear actuation step;
    pivotally driving said lever mechanism at said third and fourth positions, such that respective portions of said lever mechanism travel said third and fourth distances respectively, thereby causing said linear actuator member coupled thereto to travel through an eleventh linear actuation step;
    pivotally driving said lever mechanism at said first, second and fourth positions so as to cause respective portions of said lever mechanism to travel through said first, second and fourth distances respectively, thereby causing said linear actuator member coupled thereto to travel through a twelfth linear actuation step;
    pivotally driving said lever mechanism at said first, third and fourth positions so as to cause respective portions of said lever mechanism to travel through said first, third and fourth distances respectively, thereby causing said linear actuator member coupled thereto to travel through a thirteenth linear actuation step;
    pivotally driving said lever mechanism at said second, third and fourth positions so as to cause respective portions of said lever mechanism to travel through said second, third and fourth distances respectively, thereby causing said linear actuator member coupled thereto to travel through a fourteenth linear actuation step;
    pivotally driving said lever mechanism at said first, second, third and fourth positions so as to cause respective portions of said lever mechanism to travel through said first, second, third and fourth distances respectively, thereby causing said linear actuator member coupled thereto to travel through a fifteenth linear actuation step.

* * * * *